United States Patent [19]
White et al.

[11] 3,825,733
[45] July 23, 1974

[54] TELEMETRY METHOD AND APPARATUS

[76] Inventors: Dowell White, 1312 Jessie Ln., Pasadena, Tex. 77502; Daniel L. Craig, 225 Burwell, Highlands, Tex. 77562

[22] Filed: Aug. 11, 1971

[21] Appl. No.: 170,736

[52] U.S. Cl............ 235/151.31, 235/151.3, 340/151
[51] Int. Cl............................................. G06g 7/62
[58] Field of Search.................... 235/151.31, 151.3; 340/150, 151, 152, 177–179, 201, 210; 179/2; 329/201; 318/641; 324/57, 62, 105, 73 AT

[56] References Cited
UNITED STATES PATENTS

| | | | |
|---|---|---|---|
| 3,387,266 | 6/1968 | Swartwout et al. | 340/179 UX |
| 3,417,390 | 12/1968 | Turtle | 340/210 X |
| 3,560,948 | 2/1971 | Inose et al. | 340/210 X |
| 3,562,729 | 2/1971 | Hurd | 340/210 |
| 3,634,663 | 1/1972 | Williams et al. | 235/151.31 |

*Primary Examiner*—Joseph F. Ruggiero
*Attorney, Agent, or Firm*—Joe E. Edwards; Julian Clark Martin

[57] ABSTRACT

A method and apparatus for telemetry, wherein first and second electrical signals are generated and applied across a remotely located electrical quantity, such as voltage or resistance, desired to be measured. The interaction of such first and second electrical signals with the electrical quantity to be measured produces first and second resultant electrical signals which are used by a computer or analog portion of the telemeter to determine the value of the electrical quantity in question.

60 Claims, 11 Drawing Figures

PATENTED JUL 23 1974

DOWELL WHITE
DANIEL L. CRAIG
INVENTORS.

BY Vincent Martin
Joe E. Edwards
Jack R. Springett

ATTORNEYS

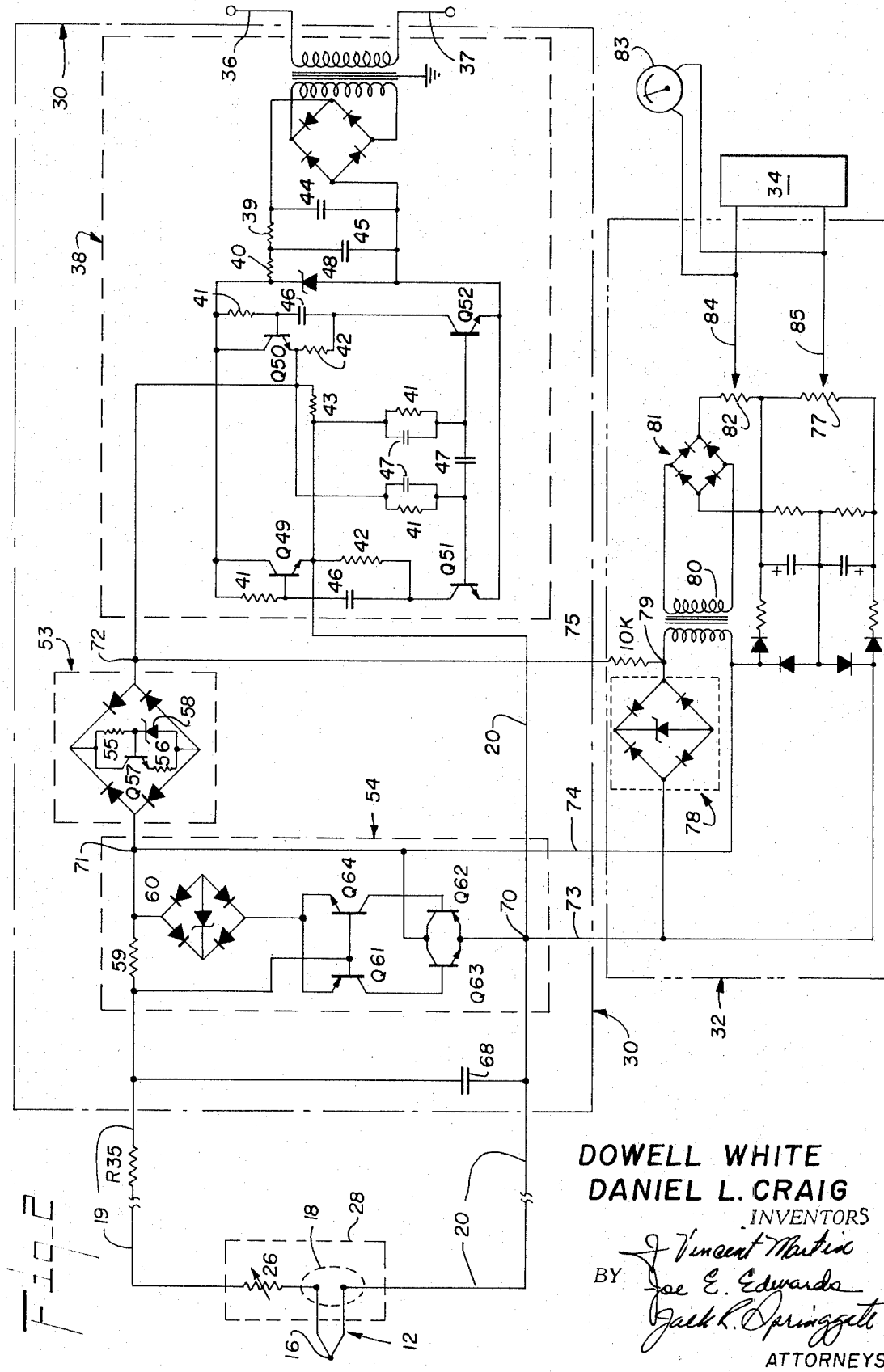

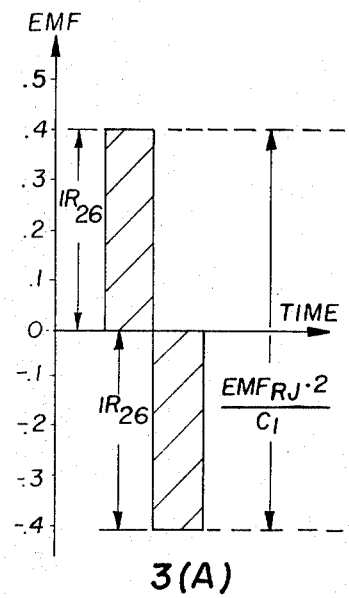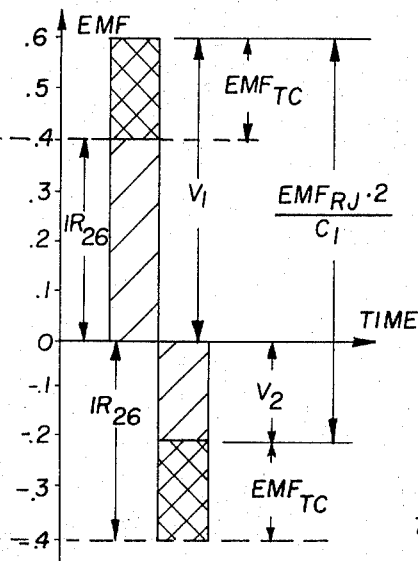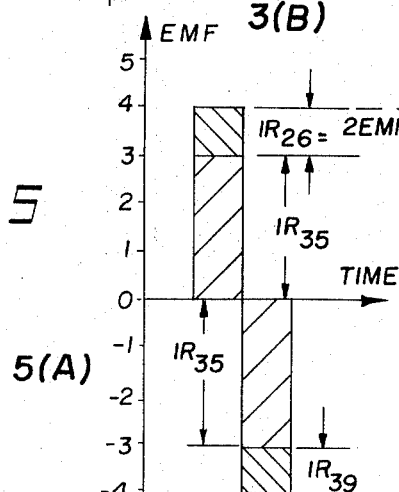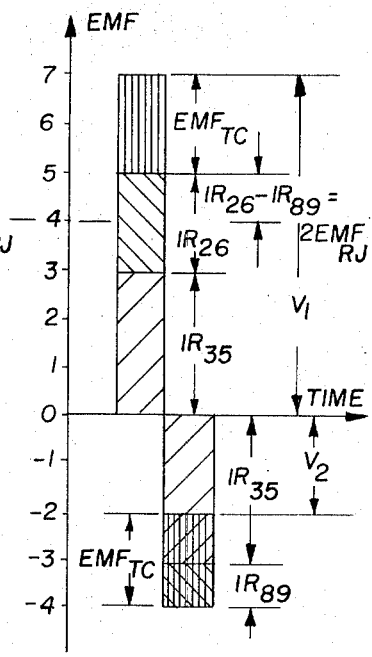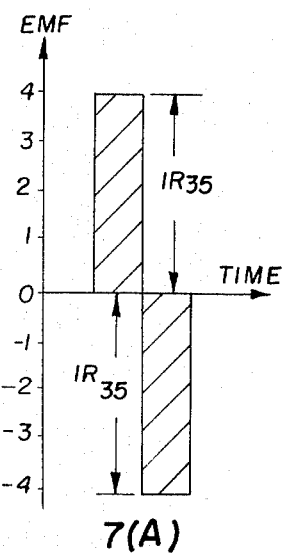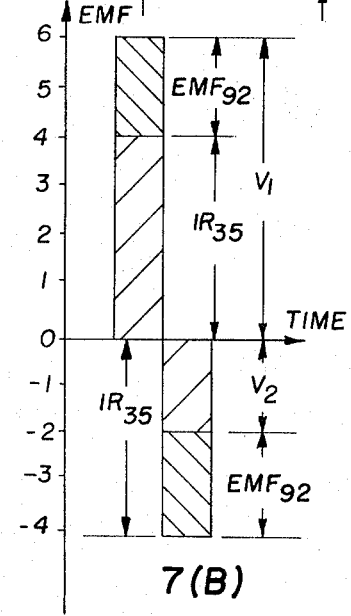

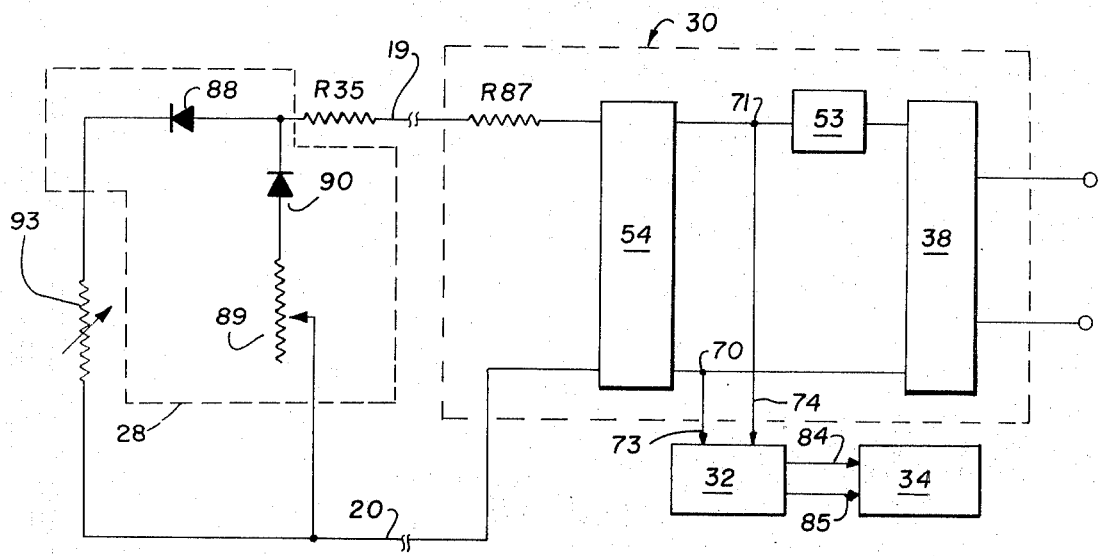
Fig_8
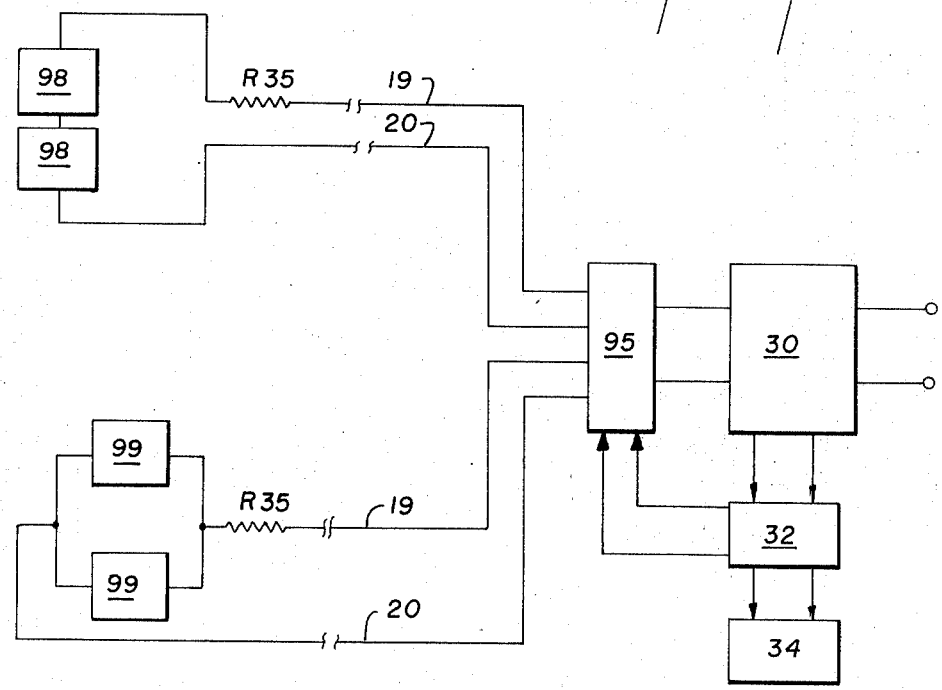
Fig_11
DOWELL WHITE
DANIEL L. CRAIG
INVENTORS

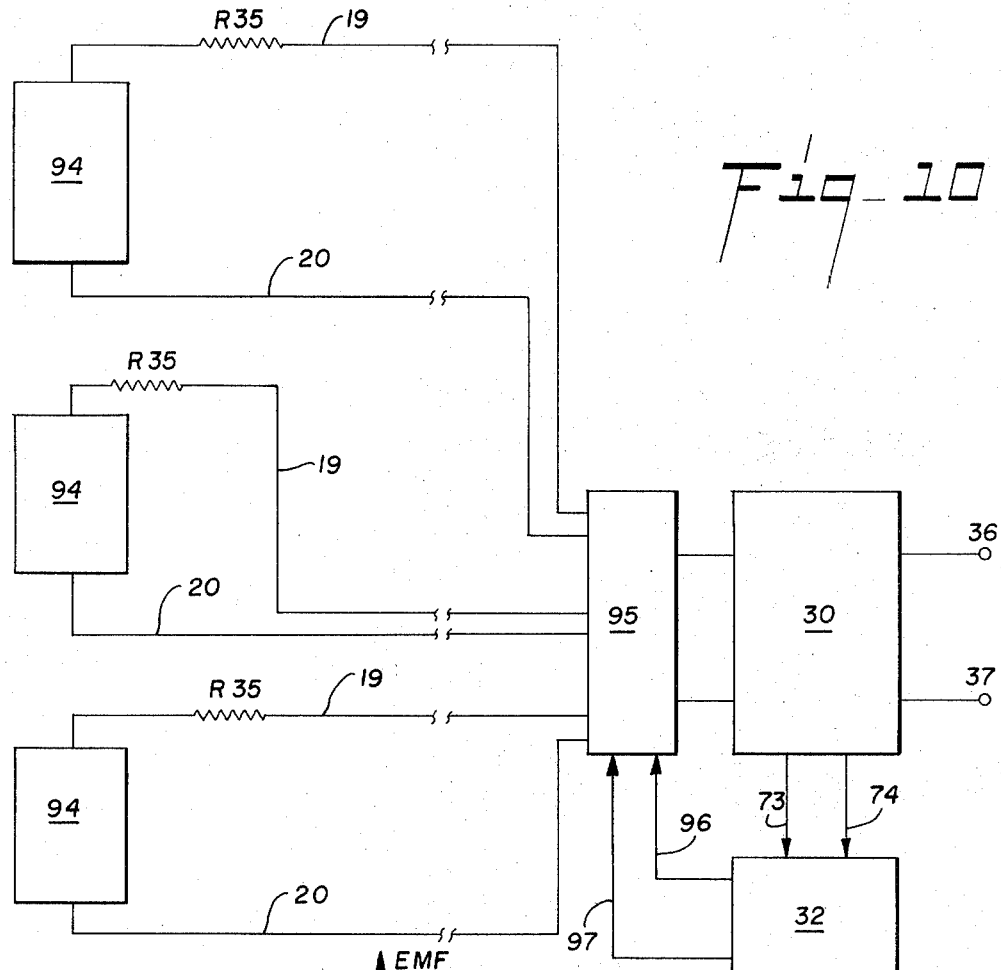
Fig. 10
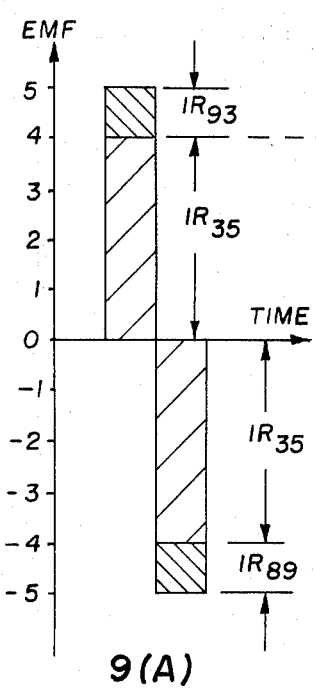
9(A)
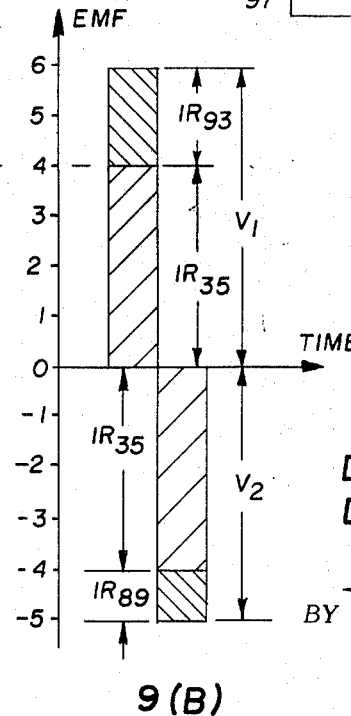
9(B)
Fig. 9
DOWELL WHITE
DANIEL L. CRAIG
INVENTORS

TELEMETRY METHOD AND APPARATUS

BACKGROUND AND OBJECTS OF THE INVENTION

This invention relates to an improved method of telemetry and apparatus therefor. The invention has particular application to the remote determination of voltage, such as the voltage generated by the measuring junction of a thermocouple, or resistance.

There exist well known methods and apparatus for detecting and measuring a quantity, such as temperature, and transducing such measured quantity to a porportional electrical signal. Telemetry is defined herein as the method of determining the value of an electrical signal, such as the transduced signal, at a distant station. A telemeter is defined as the entire apparatus utilized to accomplish such determination.

Prior telemetry practices utilizing long electrical conductors to transmit electrical signals representative of a voltage or resistance to be measured from a detection measuring apparatus to a remotely located determining apparatus have generally required a power source and/or amplification means at the detection/measuring apparatus to drive the electrical signal over the long distances involved. Some prior telemetry practices utilizing long electrical conductors, such as where a resistance value is to be transmitted and determined, have succeeded in omitting the power source and/or amplification means at the detection/measuring apparatus, and have utilized a power source and/or amplification means at the determining apparatus to transmit the resistance signal; but these practices have required an additional conductor from the detection/measuring apparatus to the determining apparatus for compensation for the resistance of the long electrical conductors.

We have discovered an improved method and apparatus of telemetry utilizing long electrical conductors for the remote determination of an unknown voltage or resistance wherein the need to supply a power source and/or amplification means at the detection and measuring apparatus has been overcome, and, in resistance measurement, the need for a compensation conductor between the detection/measuring apparatus and the determining apparatus has been eliminated. Moreover, our novel method and apparatus has greater simplicity and accuracy than the previous methods and apparatus.

Our improved method and apparatus is particularly applicable to thermocouples, wherein effective telemetry must overcome two problems which arise from the basic nature and characteristic of thermocouples. First, the voltage potential developed by a thermocouple is not solely the result of the temperature sought. Rather, it is the difference between two voltage potentials, one developed by the measuring junction and the other by the reference junction of the thermocouple. Thus some means must be provided to take into account and compensate for the voltage potential developed by the reference junction. Second, the resultant voltage potential developed by a thermocouple is small (for instance, iron/constantan generates approximately 35 millivolts at a temperature difference between the junctions of the thermocouple of approximately 1,100° Fahrenheit) and, accordingly, problems arise in accurately transferring such voltage signal to a station located remotely from the thermocouple.

In prior practices, these problems have often been overcome by extending the thermocouple wires themselves so that the reference junction of the thermocouple is physically located at the distant determining apparatus and by adding reference junction compensation means at the determining apparatus. This solution is disadvantageous because it requires the use of long lengths of expensive thermocouple wire. Furthermore, the resistance of the thermocouple wire is much greater than the resistance of ordinary electrical wire, constructed of a material such as copper, and therefore creates greater error in the existing telemetry practices. Another solution which has often been employed is to supply electrical amplification means and reference junction compensation means at the thermocouple and amplify and transmit the compensated signal over ordinary conductors to the remotely located determining apparatus. This second solution (commonly called "temperature transfer") is disadvantageous because it requires an amplifying means at the thermocouple (where, in many cases, the ambient temperature is too high for the electronic circuitry of the amplifier and thus means for insulating the amplifier from the heat is required) and it requires the supplying of power to such amplifying means.

Our improved apparatus and method of telemetry for thermocouples allows the voltage potential developed by the measuring junction of a thermocouple to be determined and indicated at a station located remotely from the thermocouple without requiring the use of long lengths of expensive and high resistance thermocouple wire and without requiring amplifying means and power at the thermocouple.

It is, therefore, an object of this invention to provide an improved method and apparatus of telemetry of an unknown voltage or resistance which has greater simplicity and accuracy than the methods and apparatus previously used.

It is an object of this invention to provide an improved method and apparatus for telemetry of an unknown voltage or resistance which utilizes long electrical conductors between a detecting/measuring apparatus and a determining apparatus but which has no appreciable error introduced into the measured electrical signal and determination thereof due to the resistance of the long electrical conductors, thereby allowing the accurate determination of extremely small changes in the voltage or resistance being measured and determined.

Additionally, it is an object of this invention to provide an improved method and apparatus of telemetry which has particular application to thermocouples and which determines at a remote location the voltage potential generated by the measuring junction of a thermocouple.

Another object of this invention is to provide an improved method and apparatus for telemetry which has particular application to thermocouples and which determines at a remote location the voltage potential developed by the measuring junction of a thermocouple without the thermocouple wires being extended to such remote determining location.

A further object of this invention is to provide an improved method and apparatus for telemetry which has particular application to thermocouples and which determines at a remote location the voltage potential generated by the measuring junction of a thermocouple without amplification means being needed at the thermocouple to amplify the low level thermocouple signals.

A still further object of this invention is to provide an improved method and apparatus for telemetry which has particular application to thermocouples and which determines at a remote location the voltage potential generated by the measuring junction of a thermocouple, wherein ordinary electrical conductors, such as copper, connect the output of the thermocouple to such remote location.

Another object of this invention is to provide an improved method and apparatus for telemetry wherein a portion of the telemeter located remotely from the electrical quantity to be measured generates a first and second electrical signal, each of which is applied over ordinary conductors to said electrical quantity to be measured, the interaction of such first and second electrical signals with the electrical quantity to be measured effects a first and second resultant electrical signal, a portion of the telemeter senses such first and second resultant electrical signals at the remote location, and from such data an analog portion of the telemeter or a computer (digital or analog) coupled into the telemeter determines the electrical quantity being measured.

BRIEF DESCRIPTION OF THE DRAWINGS

These and other objects and advantages of the present invention are hereinafter set forth and explained with reference to the drawings wherein like reference numbers indicate like parts:

FIG. 2 is a combined block and schematic diagram of the telemeter shown in FIG. 1, showing preferred electrical components of the signalling means and a preferred analog determining means.

FIG. 3 comprises two graphs of the peak voltages monitored by the telemeter shown in FIG. 2.

FIG. 5 comprises two graphs of the peak voltages monitored by the modified telemeter shown in FIG. 4.

FIG. 7 comprises two graphs of the peak voltages monitored by the telemeter shown in FIG. 6.

FIG. 8 is a combined block and schematic diagram of a telemeter according to this invention applied to a resistance source.

FIG. 9 comprises two graphs of the peak voltages monitored by the telemeter shown in FIG. 8.

FIG. 10 is a block diagram of a telemeter according to our invention utilized to determine the value of each of a plurality of unknown electrical quantities.

FIG. 11 is a block diagram of a telemeter according to our invention utilized to determine the value of a series or parallel network of electrical quantities.

DESCRIPTION OF THE INVENTION

A. Generally

The method and apparatus for telemetry according to this invention utilizes ordinary electrical conductors to connect an electrical quantity to be measured with portions of the telemeter located remotely therefrom. The electrical quantity to be measured is generally a voltage or resistance generated by a transducer, such as a thermocouple or a resistance source. Rather than transmitting such electrical quantity through the conductors in the traditional sense, the telemeter according to our invention remotely generates and supplies first and second electrical signals through said conductors to said electrical quantity to be measured and remotely monitors the voltage potential across and current flowing through such conductors as a result of such first and second electrical signals interacting with the electrical quantity to be measured. The telemeter according to our invention utilizes these voltage and current parameters to determine the value of the electrical quantity in question.

When the method and apparatus is applied to a thermocouple, a means for compensating for the voltage potential developed by the reference junction of the thermocouple is connected in a desired manner to the thermocouple in close proximity thereto. The electrical conductors connect the thermocouple and the reference junction compensating means with the rest of the telemeter located remotely therefrom. First and second electrical signals are generated and applied to the thermocouple and reference junction compensation means. The first and second resultant electrical signals are monitored at the remote location and utilized to determine the voltage potential developed by the measuring junction of the thermocouple.

B. Method and Apparatus of Our Invention Applied to a Single Thermocouple

Figure 1:
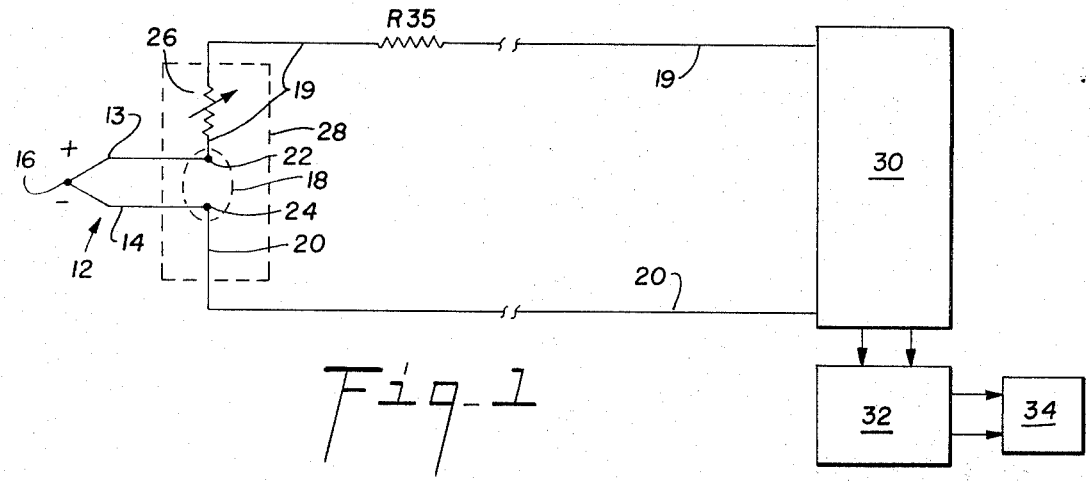
FIG. 1 is a combined block and schematic diagram of a telemeter according to this invention applied to a single thermocouple.

FIG. 1 illustrates schematically the major components of a telemeter according to our invention applied to a single thermocouple. Thermocouple 12 (hereinafter TC in formulas) is an ordinary device in which two dissimilar metals, such as iron 13 and constantan 14, join to form measuring junction 16 (hereinafter MJ in formulas). The reference junction (hereinafter RJ in formulas), referred to generally by the numeral 18, is formed by the joinder of the thermocouple wires iron 13 and constantan 14 with the ordinary conductors 19 and 20 at junctions 22 and 24, respectively. In accordance with the well-known principle of thermoelectricity, the measuring junction 16 and the two junctions 22 and 24 comprising the reference junction 18 each develop small DC voltage potentials directly proportional to their temperatures. However, the voltage potential developed by the measuring junction opposes the two voltage potentials developed by the junctions comprising the reference junction. Accordingly, a difference in the temperature of the measuring junction 16 and the temperature of the reference junction 18 produces a resultant voltage potential therebetween proportional to the temperature difference. This resultant voltage potential is the EMF generated by the thermocouple 12 and which would be measured by a DC voltmeter placed across junctions 22 and 24.

$$EMF_{TC} = EMF_{MJ} - EMF_{RJ}$$

Knowledge of the constant of proportionality ($C_p$) of the thermocouple wires 13 and 14 and the temperature of the reference junction 18 allows the determination of the voltage potential generated by the reference junction 18. The resultant voltage potential generated by the thermocouple can be determined with an ordinary voltage measuring device. Summing these two determinations yields the voltage potential generated by the measuring junction.

1. $EMF_{MJ} = EMF_{TC} + EMF_{RJ}$

And when this latter voltage potential is gaged by the known constant of proportionality ($C_p$) of the thermocouple wires 13 and 14, the temperature ($T_{MJ}$) of the measuring junction is determined.

2. $T_{MJ} = EMF_{MJ} \cdot C_p$

Since changes in the temperature of the reference junction 18 affect the resultant output voltage of the thermocouple 12, any practical method of telemetry for a thermocouple provides means for taking into account the voltage potential generated by the reference junction 18. The method and apparatus most commonly used is to cancel the changing EMF generated by the reference junction responsive to changes in ambient temperatures by adding an EMF compensation means. For instance, a temperature sensitive compensating millivolt power supply may be connected in series in an isothermal enclosure with the reference junction. The millivolt power supply is polarized so that it generates an EMF equal and opposite to that of the reference junction, and thereby cancels the effects of the reference junction. But such a compensating means is disadvantageous because power must be supplied to it. In each of the embodiments of our invention applied to a thermocouple, the reference junction EMF is taken into account by adding a compensating impedance means, such as resistor 26, with resistance substantially linear and directly proportional to its temperature within a preselected range of temperatures, in series with one of the junctions comprising the reference junction 18 of the thermocouple. Compensating resistor 26 and reference junction 18 are maintained in an isothermal enclosure 28 so that they will both be subjected at all times to the same ambient temperature.

Conductors 19 and 20, ordinary electrical conductors, such as copper, rather than expensive thermocouple wire, connect compensating resistor 26 and the other one of the junctions comprising reference junction 18 of the thermocouple with the rest of the telemeter according to our invention, comprised of signalling means 30, determining means 32 and display means 34, located at a remote location.

First and second electrical signals of preselected magnitude and polarity are generated by signalling means 30 and applied through conductors 19 and 20 to thermocouple 12 and compensating resistor 26. First and second resultant electrical signals are produced due to the interaction of said first and second electrical signals with thermocouple 12 and compensating resistor 26. These first and second resultant electrical signals are monitored by the remotely located determining means 32 and utilized in accordance with certain equations hereinafter derived to determine the value of the electrical quantity being measured, that is, the EMF generated by the measuring junction 16 of thermocouple 12.

In the apparatus according to our invention applied to a single thermocouple as illustrated in FIG. 1, appreciable error in the determination of the EMF generated by the measuring junction 16 of the thermocouple due to the resistance 35, depicted in the drawing as $R_{35}$, of the long electrical conductors 19 and 20 is eliminated by choosing a compensating resistor 26 with a variable ohmage which is large with respect to the ohmage of the line resistance 35. It has been found that the use of a compensating resistor 26, such as a Texas Instruments Sensistor, having linear temperature/ohmage characteristics of approximately 10K ohms at 0°C. and 20K ohms at 150°C. is satisfactory. Such a compensating resistor at all times has an ohmage larger than the ohmage of the lines 19 and 20 by a factor of one-hundred, and, as such, the telemeter according to our invention determines the EMF generated by the measuring junction 16 of the thermocouple 12 to within approximately 1 percent.

In the following derivation and description of the equations utilize by the determining means 32 to determine the measuring junction 16 of thermocouple 12, $V_1$ & $V_2$ and $I_1$ & $I_2$ represent the voltage and current components of the first and second resultant electrical signals, respectively, and the first resultant electrical signal is considered to be positive and the second resultant electrical signal negative.

Since the ohmage of resistor 26 and the voltage generated by reference junction 18 change proportionally to the same ambient temperature, the ohmage of resistor 26, or a portion of it, will be equal to the voltage generated by the reference junction 18 and thus can be used as its equivalent. The ohmage of compensating resistor 26 can be determined by dividing the average absolute values of the monitored voltage ($V_1$ and $V_2$) by the average absolute values of the monitored current ($I_1$ and $I_2$):

$$R_{26} = (|V_1| + |V_2|/2)/(|I_1| + |I_2|/2) = (|V_1| + |V_2|/|I_1| + |I_2|)$$

The known temperature characteristics of compensating resistor 26 are compared with the known temperature characteristics of reference junction 18 to provide a constant ($C_1$), which, when multiplied by the ohmage of compensating resistor 26, yields the EMF generated by the reference junction 18. Thus

3. $EMF_{RJ} = (|V_1| + |V_2|/|I_1| + |I_2|)C_1$

For improved accuracy in determining $EMF_{RJ}$, the above stated Equation (3) may be multiplied by a constant ($C_e$) which takes into account any efficiency losses existing in the system, such as, losses due to the irregularities in the individual components (transistors, etc.).

$$EMF_{RJ} = (|V_1| + |V_2|/|I_1| + |I_2|)C_1 \cdot C_e$$

The EMF generated by the entire thermocouple 12 is the difference between the absolute value of the monitored voltage ($V_1$) of the first resultant electrical signal and the voltage drop across compensating resistor 26 responsive to said first resultant electrical signal. The voltage drop across $R_{26}$ responsive to the first resultant electrical signal:

$$|I_1| \cdot R_{26} = |I_1|(|V_1| + |V_2|/|I_1| + |I_2|)$$

Therefore:
$EMF_{TC} = |V_1| - |I_1|(|V_1| + |V_2|/|I_1| + |I_2|)$
The EMF generated by the entire thermocouple is also the difference between the voltage drop across resistor 26 responsive to the second resultant electrical signal and the absolute value of the monitored voltage ($V_2$) of the second resultant electrical signal:
$EMF_{TC} = |I_2|(|V_1| + |V_2|/|I_1| + |I_2|) - |V_2|$ Summing these two half-cycle $EMF_{TC}$ equations yields:

4. $EMF_{TC} = \frac{1}{2}[(|V_1|+|V_2|)(|I_2|-|I_1|)/|I_1|+|I_2|] + \frac{1}{2}(|V_1|+|V_2|)$ Therefore, in summary, the voltage potential generated by the entire thermocouple and the voltage potential generated by the reference junction thereof are expressed in Equations (3) and (4) as functions of the voltage and current parameters of the monitored first and second resultant electrical signals resulting from the interaction of the first and second electrical signals with the thermocouple and the reference junction compensation resistor.

Examination of these equations reveals that they can be simplified if one of the voltage or current parameters of the first and second resultant electrical signals is held constant.

With the current held constant:

5. $EMF_{TC} = |V_1| - |V_2|/2$
6. $EMF_{RJ} = (|V_1|+|V_2|/2)C_1$

With the voltage held constant:

$EMF_{TC} = [(|V_1|+|V_2|)(|I_2|-|I_1|)/2(|I_1|+|I_2|)]$
$EMF_{RJ} = (|I_1|+|I_2|/2)C_1$

The telemeter according to this invention applied to a single thermocouple as illustrated in FIG. 1 utilizes a signalling means 30 which holds constant the current of the first and second electrical signals and thereby holds constant the current parameter of the first and second resultant electrical signals.

FIG. 2 diagrammatically illustrates the preferred components of the signalling means 32 and an analog determining means 34 of the telemeter according to this invention applied to a single thermcouple as illustrated in FIG. 1. Electrical power is supplied over lines 36 and 37 to the preferred signalling means 30, which functions to generate and supply across conductors 19 and 20 first and second electrical signals of preselected magnitude and polarity. In the preferred embodiment, 110 volt A.C., 60 Hertz, electrical power is received at the input of signalling means 30 and is transformed, rectified and regulated in a standard manner into a DC signal, which in turn is used to drive a bistable multivibrator generating an AC signal. The components shown in driver/multivibrator 38 in FIG. 2 are preferably valued as follows:

Resistors:
39   3K ohms
40   8K ohms
41   100K ohms
42   330 ohms
43   24K ohms

Capacitors:
44   50 uf
45   200 uf
46   25 mf
47   0.015 mf

Zenor Diode 48: 20 volt
Transistors Q49, Q50, Q51 and Q52: TI2N1304

The preferred driver/multivibrator 38 generates a symmetrical, AC, square-wave signal. The alternating half-cycles of such signal, regulated as hereinafter explained, constitute the first and second electrical signals. However, the manner in which said first and second electrical signals are generated is not sacrosanct. For instance, such signals could well be produced by a single DC power source having its polarity switched regularly from one state to another. Additionally, the frequency at which the first and second electrical signals are generated is not limited. However, a low frequency, such as 60 Hz., is advantageous because, as is well known in the art, it reduces the capacitance effects of conductors 19 and 20.

The AC signal is driven through means for regulating the current thereof. In the preferred embodiment, such current regulating means comprise a series current regulating means 53 and a shunt current regulating means 54. The series current regulating means 53 is serially connected to one output of driver/multivibrator 38 and functions to regulate the current within a desired first range of tolerances. In the preferred embodiment, the values of the components of series current regulating means 53 are as follows:

Resistors:
55   47K ohms
56   1,500 ohms

Transistor Q57: TI 2N1304
Zenor Diode 58: approx. 4.6 volts

The preferred series current regulating means 53 holds the current of said first and second electrical signals to within approximately 1 percent of the preselected value of 3 milliamps.

The shunt current regulating means 54 is connected across the output of the series current regulating means 53 and the other output of driver/multivibrator 38 and functions to regulate further within a desired second range of tolerances the already partially regulated current of the first and second electrical signals. The shunt current regulating means insures that the current through conductors 19 and 20 remains constant even when the load of the determining means 32 is imposed thereon. In the preferred embodiment, the values of the components of shunt current regulating means 54 are as follows:

Resistor 59: 100K ohms
Zenor Diode 60: approx. 7.4 volts

Transistors:
Q61   2N1302
Q62   2N1302
Q63   2N1303
Q64   2N1303

It will be apparent to those skilled in the art that shunt current regulating means 54 is actually a "voltage regulator" which regulates and precisely controls the voltage drop across resistor 59 and which shunts or by-passes excess current between the conductors 19 and 20 rather than allowing such current to flow through conductors 19 and 20 to the remote thermocouple. The shunt current regulating means 54 illustrated and described herein operates best with a large resistance presented to its output. This is satisfactorily accomplished by the large value of the compensating resistor 26.

The preferred shunt regulating means 54 holds the current of said first and second electrical signals through conductors 19 and 20 to within approximately 1 percent of the preselected value of approximately 100 microamps.

A capacitor 68, preferably of 0.1 microfarads, is connected across conductors 19 and 20 near the output of signalling means 30 to eliminate line "noise."

Thus, signalling means 30 generates a symmetrical electrical signal having a current which alternates polarity at precise intervals and almost instantaneously thereafter assumes a magnitude regulated within extremely close tolerances. The positive half-cycles of this square-wave current signal constitute the "first electrical signal" and the negative half-cycles constitute the "second electrical signal." Such first and second electrical signals are applied through lines 19 and 20 to thermocouple 12 and the compensation resistor 26 so that they may interact with the voltage generated by thermocouple 12 and the voltage drop across compensation resistor 26. However, since the absolute magnitude of the current through lines 19 and 20 is held constant, the only parameter of the first and second electrical signals which can change as a result of said interaction is the voltage. The resultant electrical signals flowing through lines 19 and 20 caused by such interaction constitute the first and second resultant electrical signals.

Stated otherwise, signalling means 30 is a power source. The parameters of electrical power are of course current and voltage. Since the current being drawn from the power source (signalling means 30) is regulated, only the voltage parameter can change as the power provided by signalling means 30 changes responsive to the load placed upon it by thermocouple 12 and compensation resistor 26.

The voltage parameters ($V_1$ and $V_2$) of the first and second resultant electrical signals are monitored at the signalling means 30 by determining means 32. The parameters are preferably monitored on the input or power side of shunt current regulating means 54 (at points 70 and 71) so that the current flowing through the thermocouple 12 and compensating resistor 26 remains constant despite the load of dtermining means 32. The first and second resultant electrical signals are preferably monitored on the output side of the series current regulating means 53 for reasons that will hereinafter be explained. The changing voltage parameters $V_1$ and $V_2$ are coupled through lines 73 and 74 to the input of means 32 for determining therefrom the EMF generated by the measuring junction of the thermocouple.

The application of Equations (5) and (6) to the voltages $V_1$ and $V_2$ is graphically illustrated in FIG. 3 which is comprised of two graphs of EMF versus time. FIG. 3(A) graphs the voltage which would be detected across points 70 and 71 with the thermocouple 12 shorted out of the circuit and the compensation resistor 26 subjected to a preselected ambient temperature. The voltages sensed across points 70 and 71 will simply be the voltage drops across compensating resistor 26 due to the current (I) of the first and second electrical signals. Since the absolute magnitude of such current is constant and the ohmage of compensating resistor 26 for any given ambient temperature is constant, the two voltage drops will be equal in magnitude but opposite in polarity. Assume for purposes of this illustration only that the current is ± 100 microamps and compensating resistor 26 is 4,000 ohms at the preselected ambient temperature. The voltage drops will be 0.4 volt. Assume also that the measuring junction 16 of thermocouple 12 is subjected to a temperature which causes it to generate an EMF of 0.6 volt, and the reference junction 18 generates an EMF of 0.4 volts when subjected to the same preselected ambient temperature as is compensation resistor 26. The resultant voltage generated by thermocouple 26 will be 0.2 volt. With the thermocouple 12 now connected back into the circuit, the first and second resultant voltages $V_1$ and $V_2$ detected across points 70 and 71 will, as illustrated in FIG. 3(B), be comprised of the voltage drops across compensating resistor 26 and the resultant EMF generated by thermocouple 12. Voltage parameters $V_1$ and $V_2$ allow the immediate determination of $EMF_{TC}$ as illustrated in FIG. 3(B), in accordance with Equation (5). The parameters $V_1$ and $V_2$ also allow the determination $EMF_{RJ}$, but, as also illustrated in FIG. 3(B), the constant $C_1$ must be utilized. In the hypothethical case, $C_1$ would be 1.00.

An analog determining means 32 which may be used to determine the voltage generated by the measuring junction of the thermocouple is diagrammatically shown in FIG. 2. The first and second resultant electrical signals transmitted over lines 73 and 74 are coupled through diodes to the input of a pair of conventional RC circuits which function conjunctively as a voltage subtractor to subtract the absolute value of the peak voltage of the second resultant electrical signal from the absolute value of the peak voltage of the first resultant electrical signal. The difference between such voltages is applied across potentiometer 77 which is adjusted to divide such difference in half. Potentiometer 77 may also be adjusted, if needed, to account for any efficiency losses (Ce) existing in the telemeter.

Shunted across the line conductors 19 and 20 on the input side of series current regulating means 53 (at point 72) is a voltage reference means 78 which functions to keep point 79 at a constant voltage equal to the voltage generated by compensating resistor 26 at a preselected null temperature, such as 0°C. Voltage reference means 78 is preferably a conventional Zenor/diode rectifier circuit. Since the current through compensating resistor 26 is constant, any change in the ohmage of compensating resistor 26 will be directly reflected as a change in voltage thereacross. Manifestly, such changes in voltage across resistor 26 will be reflected at point 71 on the output side of series current regulating means 53 as compared with point 79, which is on the input side thereof and which is being held at a constant level. The difference in voltage occurring between points 71 and 79 is coupled to transformer 80, which functions simply to isolate the reference junction measurement circuitry, and the transformed voltage is rectified by diode circuit 81 and applied across potentiometer 82. Potentiometer 82 is adjusted to divide the voltage applied across it by two and by the percentage necessary to take into account the temperature constant ($C_1$) of the compensating resistor 26, as well as, if desired, by any percentage necessary to take into account the loss of efficiency constant (Ce).

The voltage output of potentiometer 77, as read by a DC voltmeter (particular circuitry not shown), is equal to the resultant voltage generated by the thermocouple 12. The voltage output of potentiometer 82, as read by a DC voltmeter (particular circuitry not shown), is equal to the voltage generated by the reference junction 18 of the thermocouple 12. Accordingly, if a DC voltmeter 83 is connected across the output lines 84 and 85 of determining means 32, it will add the voltage outputs of potentiometers 77 and 82 and yield the voltage generated by the measuring junction 16 of thermocouple 12. These voltages may also be transmitted to conventional display means 34 which functions to apply thereto the constant of proportionality ($C_p$) of the thermocouple wires 13 and 14 and to provide a visual indication of the temperature sensed by the measuring junction 16 of the thermocouple 12.

Determining means 32 may also be a general-purpose analog digital computer programmed to solve Equations (1), (2), (5) and (6). If a digital computer is utilized, a conventional analog-to-digital converter should be employed. The output of the computer is preferably coupled to a display means 34 which functions to provide a visual indication of the temperature sensed by the measuring junction of the thermocouple.

C. Preferred Embodiment of Invention Applied to a Single Thermocouple

Figure 4:
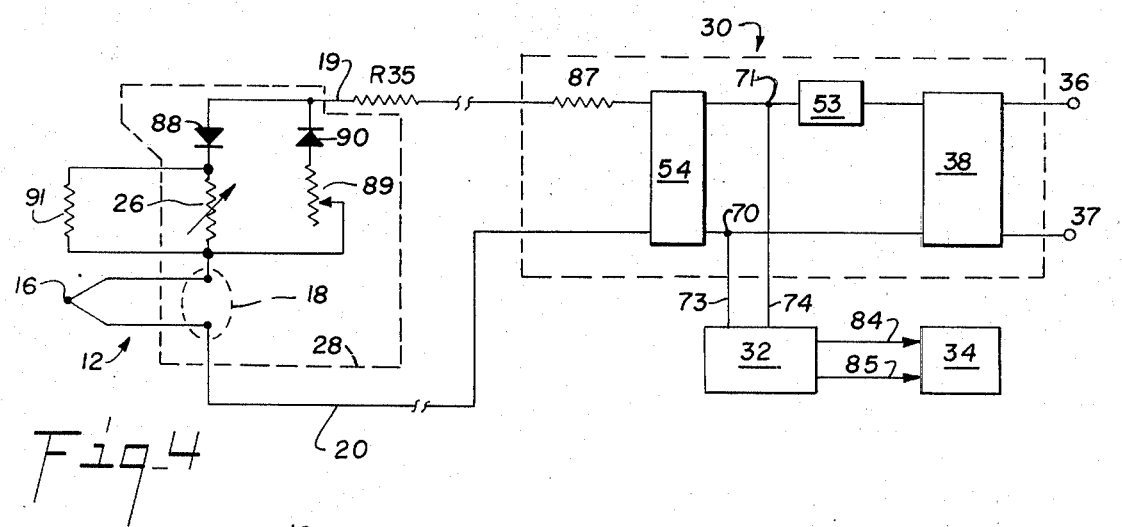
FIG. 4 is a combined block and schematic diagram of a preferred embodiment of a telemeter according to this invention applied to a single thermocouple.

FIG. 4 illustrates the preferred embodiment of a telemeter according to this invention applied to a single thermocouple. In a preferred embodiment, the ohmage of the compensating resistor 26 does not need to be large relative to the resistance 35 of the conductors 19 and 20 between the thermocouple 12 and the remote signalling means 32 and determining means 34. Rather, means are associated with thermocouple 12 and its attendant reference junction compensation resistor 26 which remove completely the effects of line resistance 35 from the determination of the voltage generated by the measuring junction 16 of the thermocouple 12.

As in the embodiment of the invention described with respect to FIGS. 1–3, the preferred embodiment of the telemeter has a signalling means 30, determining means 32 and display means 34 located remotely from thermocouple 12 and its compensating resistor 26. The components of signalling means 30 are preferably identical to the components described with respect to the signalling means 30 illustrated in FIG. 2, with two exceptions. First, in this preferred embodiment of the invention as applied to a single thermocouple, means are associated with the thermocouple to obviate the effects of line resistance 35 and thus there is no need for reference junction compensating resistor 26 to be large with respect to the line resistance 35. However, as previously discussed, shunt current regulating means 54 preferably has a large resistance presented to its output. Accordingly, a resistor 87 is preferably added to one of the conductors 19 or 20 of sufficient ohmage, such as 5 to 15,000 ohms, to raise the "line resistance" presented to the shunt current regulating means 54 to a level which will ensure that such regulating means 54 holds the current within the desired tolerance limits. Second, as will hereinafter be explained, line 75 can be omitted.

The means associated with the thermocouple 12 for obviating the effects of the line resistance 35 (as increased by the addition of resistor 87) function and are preferably constructed as follows: A diode 88 is connected in series with compensating resistor 26 so that only one of the first and second electrical signals generated by signalling means 30 can flow through resistor 26. Another current path is provided in parallel with compensating resistor 26 through nulling resistor 89 and diode 90. Thus both the first and second electrical signals flow through thermocouple 12 and lines 19 and 20, but only one of the first and second electrical signal flows through compensating resistor 26 and only the other of the first and second electrical signal flows through nulling resistor 89.

Compensating resistor 26 is selected to have a resistance which is substantially linear and directly proportional to its temperature and which possesses temperature/ohmage characteristics for any temperature in a preselected temperature range such that when the first electrical signal is driven therethrough, it produces a voltage drop with twice the magnitude of the EMF generated by the reference junction 18 of the thermocouple 12 at the same temperature. If linear stability need be added to the chosen compensating resistor 26, a resistor 91 of large ohmage can be connected in parallel with such resistor 26. Diodes 88 and 90 are polarized so that the voltage dropped across compensating resistor 26 is opposite in polarity to the EMF generated by the reference junction 18 of the thermocouple 12. Nulling resistor 89 is adjusted so that the voltage drop across it equals the voltage drop across compensating resistor 26 at a desired ambient temperature, such as 0°C. The system is then nulled at 0°C.

The nulling resistor 89 may be any resistance which can be adjusted or selected for a particular value for nulling purposes and effectively maintains this value for reference purposes throughout the ambient temperature range of the compensating resistor 26. Preferably the diodes 88 and 90 and the nulling resistor 89 are encapsulated within the isothermal enclosure 28 along with the compensating resistor 26 and the reference junction 18 of the thermocouple 12 so that all of these elements are subjected to the same ambient temperatures.

Use of the above described line resistance compensation means is doubly advantageous. First, it removes all error caused by the resistance 35 of lines 19 and 20 in the determination of the EMF generated by the measuring junction 16 of the thermocouple 12. Second, it is no longer necessary to determine $EMF_{TC}$ and $EMF_{RJ}$ in accordance with Equations (5) and (6) in order to determine $EMF_{MJ}$; rather, $EMF_{MJ}$ can be directly determined from the voltage parameters $V_1$ and $V_2$ of the first and second resultant electrical signals in accordance with the following equation:

7. $EMF_{MJ} = |V_1| - |V_2|/2$

The application of the voltage parameters $V_1$ and $V_2$ to Equation (7) is graphically illustrated in FIG. 5 which is comprised of two graphs of units of EMF versus time. FIG. 5(A) illustrates the voltages which would be detected at points 70 and 71 with the thermocouple 12 shorted from the line, compensating resistor 26 subjected to a preselected first ambient temperature and nulling resistor 89 adjusted to the same ohmage value as compensating resistor 26. The voltage parameter of the first resultant electrical signal (positive signal) would be comprised of the voltage drop through the lines 19 and 20 plus the voltage drop across compensating resistor 26. The voltage parameter of the second resultant electrical signal (negative signal) would be comprised of the same magnitude of voltage drop through the lines 19 and 20 plus the voltage drop across nulling resistor 89, which has been adjusted to equal $IR_{26}$. By definition, $IR_{26} = 2\ EMF_{RJ}$. This has arbitrarily been chosen in FIG. 5 to be four EMF units.

FIG. 5(B) illustrates the voltage parameters $V_1$ and $V_2$ which would be detected at points 70 and 71 with the thermocouple connected back in the system and, as would probably be the case, the reference junction 18 of thermocouple 12 and compensating resistor 26 subjected to a second ambient temperature greater than the first ambient temperature. Increasing the ambient temperature increases the voltage dropped across compensating resistor 26. However, nulling resistor 89 and the line resistance 35, which are not appreciably variable, remain the same. Accordingly, $IR_{26}$ is arbitrarily shown to increase from one EMF unit to two EMF units. The difference between this increased $IR_{26}$ and $IR_{89}$ will be equal to twice the EMF generated by the reference junction 18 of thermocouple 12. Also added to and subtracted from these voltages is the resultant EMF generated by the thermocouple 12. Thus, $V_1$ is comprised of the voltage drop through lines 19 and 20, the voltage dropped across compensating resistor 26, and the resultant EMF generated by the thermocouple 12. $V_2$ is comprised of the voltage drop through lines 19 and 20 and the voltage dropped across nulling resistor 89, less the resultant EMF generated by the thermocouple 12. The voltage drops caused by the resistance 35 of lines 19 and 20 cancel each other. The voltage drop across nulling resistor 89 cancels the portion of the voltage dropped across compensating resistor 26 equal to the nulled value of compensating resistor 26. Thus:

$$V_1 - V_2/2 = 2\ EMF_{TC}/2 + 2\ EMF_{RJ}/2 = EMF_{TC} + EMF_{RJ} = EMF_{MJ}$$

An analog determining means 32 can be constructed as illustrated and described in FIG. 2 with voltage reference means 78, transformer 80, rectifier 81 and potentiometer 82 omitted, or, if all of these components are included, potentiometer 82 adjusted to zero (thereby eliminating the portion of the determining means 32 designed to determine the voltage dropped across reference junction compensation resistor 26). Potentiometer 77 is adjusted so that it divides by two the voltage applied to it. A direct indication of $EMF_{MJ}$ is thereby obtained by DC voltmeter 83. Or, as described with respect to FIG. 2, the absolute values of the voltages ($V_1$ and $V_2$) of the first and second resultant electrical signals may be monitored and utilized by a general purpose digital or analog computer programmed to solve Equation (7) to determine the EMF generated by the measuring junction 16 of thermocouple 12.

D. Invention Applied to Single Source Generating Single Voltage

Figure 6:
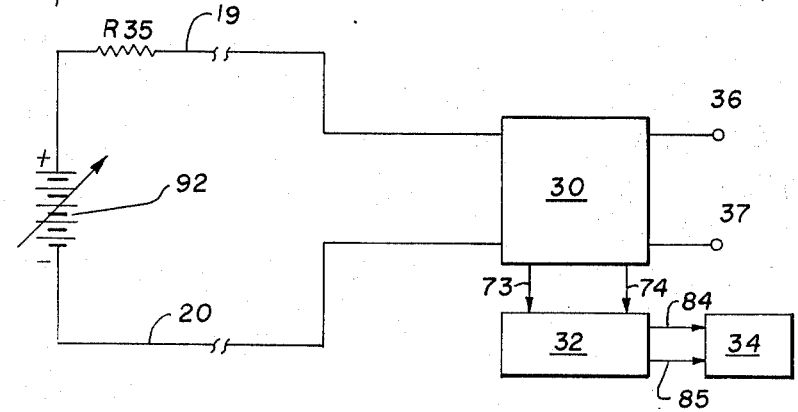
FIG. 6 is a combined block and schematic diagram of a telemeter according to this invention applied to a single voltage source.

The telemetry method according to this invention can be applied not only to a device, such as a thermocouple, which produces two electric quantities, but also to a device which produces only one electric quantity. The value of such electrical quantity will be determined without any error being introduced therein by the resistance of the long lines. FIG. 6 illustrates a telemeter according to this invention applied to a measuring transducer 92 which generates one varying DC voltage. The signalling means 30 and determining means 32 are constructed identical to that of the preferred embodiment of the telemeter applied to a single thermocouple as illustrated in FIG. 4. The first and second electrical signals generated by and applied across voltage source 92 by signalling means 30 will produce first and second resultant electrical signals as a result of interacting with voltage source 92. The voltage parameters $V_1$ and $V_2$ of the first and second resultant electrical signals allow the direct determination of $EMF_{92}$ in accordance with the following equation:

8.  $EMF_{92} = |V_1| - |V_2|/2$

FIG. 7 illustrates graphically the application of the voltage parameters $V_1$ and $V_2$ to Equation (8). FIG. 7(A) graphs units of EMF versus time and illustrates the voltages which would be detected over lines 73 and 74 with the voltage source 92 shorted from the system. The voltages are merely the voltage drops through lines 19 and 20. FIG. 7(B) again graphs units of EMF versus time but illustrates the voltages which would be detected over lines 73 and 74 with voltage source 92 connected back into the system. The voltage drops across lines 19 and 20 remain the same, but the voltage generated by voltage source 92 is now added thereto or deleted therefrom. The voltage drops through lines 19 and 20 cancel each other and thus the voltage parameters $V_1$ and $V_2$ allow a direct determination of the value of voltage source 92.

As previously described with respect to the preferred embodiment of the telemeter applied to a single thermocouple, the analog determining means 32 illustrated and described in FIG. 2, with potentiometer 82 adjusted to zero and potentiometer 77 adjusted to divide by two, can be utilized to provide a direct readout of $EMF_{92}$ over DC voltmeter 83. Or, as described with the previously discussed uses of our telemeter, the voltage parameters $V_1$ and $V_2$ can be used by an analog or digital computer programmed to solve Equation (8).

E. Invention Applied to Single Source Generating Single Resistance

FIG. 8 illustrates a telemeter according to our invention applied to a measuring transducer 93 which generates one varying resistance. The portions of the telemeter located remotely from the resistance source 93 and its attendant components consist of and are identical to the signalling means 30 (including resistor 87), determining means 32 and display means 34 illustrated and described in FIG. 4. The resistance source 93 has associated therewith means for compensating for the resistance 35 of lines 19 and 20. Such line resistance compensation means is similar to that illustrated and described in FIG. 4 and preferably consists of diodes 88 and 90 and nulling resistor 89. Diodes 88 and 90 allow only one of the first and second electrical signals generated by signalling means 30 to flow through the resistance source 93. The outer of said signals flows through nulling resistance 89. Resistance 89 is adjusted so that the voltage drops produced across it and resistance source 93 by the first and second electrical signals are equal for a desired magnitude of the resistance source 93. The system is then nulled. The nulling resistor 89 may be any resistance which can be adjusted or selected for a particular value for nulling purposes and effectively maintains this value for reference purposes throughout the ambient temperature range of the resistance source 93. Preferably the diodes 88 and 90 and the nulling resistor 89 are encapsulated within the isothermal enclosure 28 along with the resistance source 93 so that all of these elements are subjected to the same ambient temperatures. When the magnitude or state of the quantity being measured causes the resistance 93 to change, the absolute values of the voltage parameters $V_1$ and $V_2$ of the first and second resultant electrical signals will allow the determination of the voltage drop across the resistance source 92 caused by the change in the magnitude or state of the quantity being measured, in accordance with the following equation:

9.  $|I| \cdot R_{93} = |V_1| - |V_2|$

Since the absolute magnitude of the element ($I$) is known, the resistance 93 can be easily determined.

FIG. 9 illustrates graphically the application of the voltage parameters $V_1$ and $V_2$ of the first and second resultant electrical signals to Equation (9). FIG. 9(A) graphs units of EMF versus time and illustrates the voltages which would be detected over lines 73 and 74 with the system nulled. $V_1$ would be comprised of the voltage dropped through lines 19 and 20 plus the voltage dropped across the resistance source 93. $V_2$ would be comprised of the voltage dropped through lines 19 and 20 plus the voltage dropped across nulling resistor 89, which has been adjusted to equal that dropped across compensating resistor 93.

FIG. 9(A) also graphs units of EMF versus time but the ohmage of resistance source 93 has increased. The line resistance 35 and the nulling resistor 89 of course remain the same. The voltage drops across lines 19 and 20 cancel each other and thus $V_1$ minus $V_2$ yields the voltage dropped across resistance source 93 due to the change in its ohmage from the nulled value thereof.

A determining means 32 identical to that described in FIG. 2 can be utilized to obtain a direct determination of $R_{93}$ by adjusting potentiometer 82 to zero and adjusting potentiometer 77 to divide the voltages applied thereto by a constant equal to the inverse of the absolute magnitude of the current ($I$) and reading the output thereof with DC voltmeter 83. Or the voltage parameters can be utilized by a properly programmed digital or analog computer to solve Equation (9).

Of course, the invention may be applied to a strain gauge as easily as to a varying resistance source. As is well known to those skilled in the art, a strain gauge is a device with a built-in temperature compensating resistance. A strain gauge has two varying resistances. Both of the resistances compensate for changes in temperature, but only one of the resistances compensates for changes in strain. Thus, in applying this invention to a strain gauge, the two conductors and the current flow-allowing devices (the diodes) preferably are connected to the strain gauge whereby one of the first and second electrical signals is applied to the resistance which compensates for both strain and temperature and the other of the first and second electrical signals is applied to the resistance which compensates for only temperature.

F. Invention Applied to a Plurality of Electrical Quantities

Our invention is particularly useful when there exists a need to determine the value of each of a plurality of electrical quantities. FIG. 10 schematically illustrates the application of our invention to a plurality of "black boxes" 94, each of which contains one of the electrical quantities described herein, that is, a thermocouple, single voltage source or resistance source. Each such electrical quantity preferably has associated therewith the components, if any, described herein with respect to FIGS. 4, 6 and 8, respectively. The signalling means 30 is preferably constructed as described with respect to FIG. 4. Coupled to the output of signalling means 32 and to each of the pairs of conductors 19 and 20 leading to an electrical quantity 94 is a conventional switching means 95, which functions to connect selectively signalling means 32 with one of the electrical quantities 95.

Determining means 32 is preferably a general purpose digital or analog computer programmed to provide over lines 96 and 97 the necessary signals to operate switching means 95 and to thereby connect sequentially each thermocouple to signalling means 30, to monitor the voltage parameters of the first and second resultant electrical signals produced thereby, and to apply such monitored data to the appropriate equation or equations to determine the value of the electrical quantity in question.

Additionally, as schematically illustrated in FIG. 11, our invention has application to a plurality of the same electrical quantities connected in series, such as thermocouples represented by the numeral 98, or in parallel, such as resistance sources represented by the numeral 99. The plurality of electrical quantities preferably has associated therewith the components, if any, described herein with respect to FIGS. 4, 6 and 8, respectively. Our invention determines in the manner previously described the composite value of the electrical quantities arranged in the series or parallel networks. The analog portion of our telemeter or the equations solved by a computer according to our invention can incorporate a known constant, such as a constant reflecting the number of electrical quantities involved in a series arrangement, to obtain from such composite value a meaningful solution.

Conclusion

From the foregoing it can be seen that the present invention provides a method and apparatus for the remote determination of the value of an electrical quantity with much greater simplicity and accuracy than existing methods and apparatus. By generating desired first and second electrical signals at a first location, transmitting them over ordinary conductors to the electrical quantity in question located at a remote second location, and determining from first and second resultant electrical signals monitored at the first location the value of the electrical quantity in question, the need to position expensive amplification equipment at the remote second location is overcome. When the electrical quantity in question is the voltage generated by a thermocouple, the need for expensive reference junction compensating means or extension of the thermocouple lines is overcome.

Additionally, the errors formerly introduced by the resistance of the conductors into the determination of the electrical quantity have been obviated.

It will now be apparent to those skilled in the art that various changes may be made in the construction of the telemeter without departing from the spirit of the invention. For instance, the first and second electrical signals generated by the signalling means need not be of opposite polarity, so long as the absolute magnitude of the current or the voltage of each such signal is substantially constant. Additionally, the signalling means and analog determining means can be constructed differently and with different components so long as they perform the same described functions. For instance, the shaped AC signal applied to the series and shunt current regulators may be produced by a peak-clipping network, such as a Zenor diode in combination with a bridge. Accordingly, the foregoing disclosure and description of our invention are illustrative and explanatory thereof, and various changes in the construction of the telemeter may be made within the scope of the appended claims without departing from the spirit of the invention.

What we claim is:

1. A method of telemetering to a first location the value of an electrical quantity located at a second location, the first and second locations being connected by two conductors, including the steps of:
    generating alternately at the first location first and second electrical signals of opposite polarity;

regulating each of the first and second electrical signals so that one of the electrical components of current and voltage of the first and second electrical signals is maintained constant;

transmitting the regulated first and second electrical signals individually through the conductors to the second location and applying at least one of the regulated first and second electrical signals to the electrical quantity, whereby the resistance of the conductors is substantially compensated for;

detecting the other of the electrical components of current and voltage of first and second resultant electrical signals flowing through the conductors as a result of the interaction of the regulated first and second electrical signals with the resistance of the conductors and at least one of the first and second regulated electrical signals with the electrical quantity; and determining from the detected electrical component of the first and second resultant electrical signals the value of the electrical quantity, whereby the resistance of the conductors produces no substantial error in the determination.

2. A method of telemetering to a first location the value of an electrical quantity located at a second location, wherein the electrical quantity is the voltage produced by the measuring junction of the thermocouple, wherein the thermocouple has associated therewith a means for compensating for the voltage generated by its reference junction and a means for compensating for the resistance of the conductors, according to claim 1, in which:

the detecting step includes detecting both the voltage and current components of the first and second resultant electrical signals; and, the determining step includes solving Equations (1), (3), and (4).

3. A method of telemetering to a first location the voltage produced by the measuring junction of a thermocouple located at a second location, wherein the first and second locations are connected by two electrical conductors, wherein the thermocouple has connected in series therewith a reference junction compensation resistor having an ohmage which varies linearly and proportionally to its ambient temperature for a selected range of ambient temperatures, which ohmage is sufficiently large throughout the selected range of temperatures with respect to the resistance of the conductors so that the effects of the resistance of the conductors are negligible, and wherein the reference junction of the thermocouple and the reference junction compensation resistor are maintained in an isothermal enclosure, including the steps of:

generating alternately at the first location first and second electrical signals, the current components of each of the first and second electrical signals having a selected wave form and magnitude;

transmitting the first and second electrical signals through the conductors to the second location and applying the first and second electrical signals to the thermocouple and the reference junction compensation resistor;

detecting the voltage components of first and second resultant electrical signals flowing through the conductors as a result of the interaction of the first and second electrical signals with the thermocouple, the reference junction compensation resistor, and the resistance of the conductors; and determining from the voltage components of the first and second resultant electrical signals the voltage produced by the measuring junction of the thermocouple.

4. A method of telemetering according to claim 3 wherein the step of determining from the voltage components of the first and second resultant electrical signals the voltage produced by the measuring junction of the thermocouple includes solving Equations (1), (5) and (6).

5. A method of telemetering according to claim 3 wherein the generating step includes regulating the first and second electrical signals so that the current component of each of the signals is substantially constant and identical in absolute magnitude and is of opposite polarity from the other of the current components.

6. A method of telemetering according to claim 3 wherein the step of determining from the voltage components of the first and second resultant electrical signals the voltage produced by the measuring junction of the thermocouple includes the steps of:

subtracting the absolute value of the voltage component of one of the first and second resultant electrical signals from the absolute value of the voltage component of the other of the first and second resultant electrical signals to obtain a remainder;

dividing the remainder by two to obtain a first quotient;

adding the absolute value of the voltage components of the first and second resultant electrical signals to obtain a sum;

dividing the sum by two to obtain a second quotient;

multiplying the second quotient times a first constant to obtain a product, the first constant being based on the temperature characteristics of the reference junction compensation resistor and being of a value that, when multiplied by the ohmage of the reference junction compensation resistor at any selected temperature within the selected range of temperatures, it yields a voltage equal to the voltage produced by the reference junction of the thermocouple at such temperature; and adding the absolute value of the first quotient and the absolute value of the product.

7. A method of telemetering according to claim 6 wherein the step of dividing the remainder by two to obtain a first quotient includes also dividing the remainder by a second constant to obtain the first quotient, the second constant being based on the characteristics of the various components comprising the telemetry system and being of a value that, when divided into the remainder, accounts for any efficiency losses existing in the telemetry system.

8. A method of telemetering to a first location the voltage produced by the measuring junction of a thermocouple located at a second location, wherein the first location is connected by two electrical conductors to the second location, wherein the thermocouple has connected in series therewith a reference junction compensation resistor having an ohmage which varies linearly and proportionally to its ambient temperature for a selected range of temperatures, which ohmage is such throughout the range of temperatures that when one of the first and second electrical signals is applied to the reference junction compensation resistor there is produced a voltage drop thereacross with twice the magnitude of the voltage generated by the reference junction of the thermocouple, wherein there is connected in parallel with the reference junction compensation resistor a variable nulling resistor adjusted to have an ohmage equal to the ohmage of the reference junction compensation resistor at a selected ambient temperature, and wherein at least the reference junction of the thermocouple and the reference junction compensation resistor are maintained in an isothermal enclosure, including the steps of:

generating alternately at the first location first and second electrical signals, the current component of each of the signals having a selected wave form and magnitude;

transmitting the first and second electrical signals through the conductors to the second location and applying one of the first and second electrical signals to the reference junction compensation resistors and the thermocouple and applying the other of the first and second electrical signals to the nulling resistor and the thermocouple;

detecting the voltage components of first and second resultant electrical signals flowing through the conductors as a result of the interaction of the first and second electrical signals with the reference junction compensation resistor, the nulling resistor, the thermocouple, and the resistance of the conductors; and determining from the voltage components of the first and second resultant electrical signals the voltage produced by the measuring junction of the thermocouple.

9. A method of telemetering according to claim 8 wherein the step of determining from the voltage components of the first and second resultant electrical signals the voltage produced by the measuring junction of the thermocouple includes solving Equation (7).

10. A method of telemetering according to claim 8 wherein the generating step includes regulating the first and second electrical signals so that the current component of each of the signals is substantially constant and identical in absolute magnitude and is of opposite polarity from the other of the current components.

11. A method of telemetering according to claim 8 wherein the step of determining from the voltage components of the first and second resultant electrical signals and the voltage produced by the measuring junction of the thermocouple includes the steps of:

subtracting the absolute value of the voltage component of one of the first and second resultant electrical signals from the absolute value of the voltage component of the other of the first and second resultant electrical signals to obtain a remainder; and dividing the remainder by two.

12. A method of telemetering to a first location the value of an electrical quantity located at a second location, wherein the electrical quantity is the DC voltage produced by a voltage source, and wherein the voltage source is connected by two electrical conductors to the first location, according to claim 1, in which:

the regulating step includes regulating each of the first and second electrical signals so that the current component of each of the signals is constant and identical in absolute magnitude;

the step of detecting includes detecting the voltage components of the first and second resultant electrical signals; and the determining steps includes solving Equation (9).

13. A method of telemetering according to claim 12, wherein the step of determining from the voltage components of the first and second resultant electrical signals the DC voltage produced by the voltage source, includes the steps of:

subtracting the absolute value of the voltage component of one of the first and second resultant electrical signals from the absolute value of the voltage component of the other of the first and second resultant electrical signals to obtain a remainder; and dividing the remainder by two.

14. A method of telemetering to a first location the ohmage of a variable resistance source located at a second location, wherein the first and second locations are connected by two electrical conductors, wherein there is connected in parallel with the resistance source a variable nulling resistor adjusted to have an ohmage equal to the ohmage of the resistance source at a selected condition or state of the resistance source, including the steps of:

generating alternately at the first location first and second electrical signals, the current component of each of the signals having a selected wave form and magnitude;

transmitting the first and second electrical signals through the conductors to the second location and applying one of the first and second electrical signals to the resistance source and the other of the first and second electrical signals to the nulling resistor;

detecting the voltage components of first and second resultant electrical signals flowing through the conductors as a result of the interaction of the first and second electrical signals with the resistance source, the nulling resistor, and the resistance of the conductors; and determining from the voltage components of the first and second resultant electrical signals the ohmage of the variable resistance source.

15. A method of telemetering according to claim 14 wherein the step of determining from the voltage components of the first and second resultant electrical signals the ohmage of the variable resistance source includes solving Equation (10).

16. A method of telemetering according to claim 14 wherein the generating step includes regulating the first and second electrical signals so that the current component of each of the signals is substantially constant and identical in absolute magnitude and is of opposite polarity from the other of the current components.

17. A method of telemetering according to claim 14 wherein the step of determining from the voltage components of the first and second resultant electrical signals the ohmage of the resistance source includes the steps of:

subtracting the absolute value of the voltage components of one of the first and second resultant electrical signals from the absolute value of the voltage component of the other of the first and second resultant electrical signals to obtain a remainder; and dividing the remainder by the absolute value of the current component of the first and second electrical signals.

18. A method of telemetering to a first location the composite value of a plurality of electrical quantities of the same type located at a plurality of second locations and connected in a selected network arrangement, the entire network of electrical quantities being connected by two electrical conductors to the first location, according to claim 1, wherein:

the steps of generating, transmitting and applying, detecting, and determining are performed with respect to the network of electrical quantities.

19. A telemeter for telemetering to a first location the value of an electrical quantity located at a second location, comprising:

means at the first location for alternately generating first and second electrical signals of opposite polarity;

means at the first location for regulating one of the components of voltage and current of the first and second electrical signals;

two conductors connecting between the first and second location through which the regulated first and second electrical signals are applied individually from the first location to the second location;

means at the second location for allowing at least one of the regulated first and second electrical signals to be applied to the electrical quantity;

means for detecting the other of the components of voltage and current of first and second resultant electrical signals flowing through the conductors as a result of the interaction of the resistance of the conductors with the regulated first and second electrical signals and the electrical quantity with at least one of the regulated first and second electrical signals; and means for determining from the detected component of the first and second resultant electrical signals the value of the electrical quantity.

20. A telemeter for telemetering to a first location the voltage generated by the measuring junction of a thermocouple located at a second location, comprising:

means at the first location for alternately generating first and second electrical signals;

means connected in series with the thermocouple at the second location for compensating for the voltage generated by the reference junction of the thermocouple, the reference junction compensation means having a variable ohmage which is linear and proportional to its ambient temperature for a selected range of ambient temperatures, the variable ohmage of the reference junction compensation means being sufficiently large throughout the selected range of temperatures with respect to the resistance of the conductor so that the effects of the resistance of the conductors are negligible;

two conductors connecting between the first and second location through which the first and second electrical signals are applied across both the thermocouple and the reference junction compensation means;

an isothermal enclosure in which the reference junction compensation means and the reference junction of the thermocouple are maintained;

means for detecting the voltage and current components of first and second resultant electrical signals flowing through the conductors as a result of the interaction of the first and second electrical signals with the thermocouple, the reference junction compensation means, and the resistance of the conductors; and means for determining from the voltage and current components of the first and second resultant electrical signals the value of the voltage of the measuring junction of the thermocouple.

21. A telemeter according to claim 20 wherein the means for determining from the voltage and current components of the first and second resultant electrical signals the value of the voltage of a measuring junction of the thermocouple includes means for solving Equations (1), (3) and (4).

22. A telemeter according to claim 20, including:

means for regulating the first and second electrical signals so that the current component of each of the signals has a selected wave form and magnitude;

the detecting means comprises means for detecting the voltage components of the first and second resultant electrical signals; and the determining means comprises means for solving Equations (1), (5) and (6).

23. A telemeter according to claim 22 wherein the regulating means regulates the first and second electrical signals so that the current components of each of the signals is substantially constant and identical in absolute magnitude and is of opposite polarity from the other of the current components.

24. A telemeter according to claim 22, wherein the means for solving Equations (1), (5) and (6) is a properly programmed computer.

25. A telemeter according to claim 22, wherein the means for solving Equations (1), (5) and (6) comprises:

means for subtracting the absolute value of the voltage component of one of the first and second resultant electrical signals from the absolute value of the voltage component of the other of the first and second resultant electrical signals to obtain a remainder;

means for dividing the remainder by two to obtain a first quotient;

means for adding the absolute value to the voltage component of the first and second resultant electrical signals to obtain a sum;

means for dividing the sum by two to obtain a second quotient;

means for multiplying the second quotient by a constant to obtain a product, the constant being based on the known temperature characteristics of the reference junction compensation means and being of a value that when multiplied by the ohmage of the reference junction compensation means, it yields a voltage equal to the voltage generated by the reference junction; and means for adding the absolute value of the first quotient and the absolute value of the product.

26. A telemeter for telemetering to a first location the voltage generated by the measuring junction of a thermocouple located at a second location, comprising:

means at the first location for alternately generating first and second electrical signals;

means for regulating the first and second electrical signals so that the current component of each of the first and second electrical signals has a selected wave form and magnitude;

two conductors connecting between the first and second locations through which the first and second electrical signals are transmitted;

a reference junction compensation resistor connected in series with the thermocouple at the second location, the reference junction compensation resistor having variable ohmage which is linear and proportional to its ambient temperature and possessing temperature/ohmage characteristics such that when a selected one of the first and second electrical signals is applied therethrough there is produced a voltage drop thereacross with twice the magnitude of the voltage generated by the reference junction of the thermocouple;

means connected in parallel with the reference junction compensation resistor at the second location for nulling the reference junction compensation resistor;

means associated with the reference junction compensation resistor at the second location for allowing only one of the first and second electrical signals to flow through the reference junction compensation resistor and means associated with the nulling resistor at the second location for allowing only the other of the first and second electrical signals to flow through the nulling resistor, such flow-allowing means being arranged so that both the first and second electrical signals flow through the thermocouple;

an isothermal enclosure in which at least the reference junction compensation resistor and the reference junction of the thermocouple are maintained;

means for detecting the voltage components of first and second resultant electrical signals flowing through the conductors as a result of the interaction of the first and second electrical signals with the thermocouple, the reference junction compensation resistor, the nulling resistor, and the resistance of the conductors; and means for determining from the voltage components of the first and second resultant electrical signals the voltage generated by the measuring junction of the thermocouple.

27. A telemeter according to claim 26 wherein the means for determining from the voltage components of the first and second resultant electrical signals the voltage generated by the measuring junction of the thermocouple includes means for solving Equation (7).

28. A telemeter according to claim 27 wherein the means for solving Equation (7) is a properly programmed computer.

29. A telemeter according to claim 26 wherein the regulating means regulates the first and second electrical signals so that the current components of each of the signals is substantially constant and identical in absolute magnitude and is of opposite polarity from the other of the current components.

30. A telemeter according to claim 29 wherein:
the generating means comprises means for generating an alternating current signal wherein each half cycle theref is of opposite polarity and is of substantially square-wave form, the positive half cycles being one of the first and second electrical signals and the negative half cycles being the other of the first and second electrical signals; and the regulating means comprises means for regulating the peak current of each of the half cycles of the alternating current signal to substantially the same absolute magnitude.

31. A telemeter according to claim 26 wherein:
the nulling means comprises a variable resistor; and
the flow-allowing means comprises at least one diode polarized in a preselected manner and connected in series with each of the reference junction compensation means of the nulling resistor.

32. A telemeter according to claim 26 wherein the means for determining from the voltage components of the first and second resultant electrical signals the voltage generated by the measuring junction of the thermocouple comprises:

means for subtracting the absolute value of the voltage component of one of the first and second resultant electrical signals from the absolute value of the voltage component of the other of the first and second resultant electrical signals to obtain a remainder; and means for dividing the remainder by two.

33. A telemeter for telemetering to a first location the value of an electrical quantity located at a second location, wherein the electrical quantity is the DC voltage produced by a voltage source, according to claim 20, including:

the regulating means comprises means for regulating the current component of each of the first and second electrical signals so that it has a selected wave form and magnitude;

the detecting means comprises means for detecting the voltage components of the first and second resultant electrical signals; and the determining means comprises means for solving Equation (9).

34. A telemeter according to claim 33 wherein the regulating means regulates the first and second electrical signals so that the current component of each of the signals is substantially constant and identical in absolute magnitude and is of opposite polarity from the other of the current components.

35. A telemeter according to claim 33 wherein the means for solving Equation (9) of a properly programmed computer.

36. A telemeter according to claim 33; wherein the means for solving Equation (9) comprises:

means for subtracting the absolute value of the voltage component of one of the first and second resultant electrical signals from the absolute value of the voltage component of the other of the first and second resultant electrical signals to obtain a remainder; and means for dividing the remainder by two.

37. A telemeter for telemetering to a first location the ohmage of a resistance source located at a second location, comprising:

means at the first location for alternately generating first and second electrical signals;

means for regulating the first and second electrical signals so that the current component of each of the first and second electrical signals has a selected wave form and magnitude;

two conductors connecting between the first location and the second location through which the first and second electrical signals are transmitted;

a nulling resistor connected in series with the resistance source and adjusted to have an ohmage equal to the ohmage of the resistance source at a selected state;

means associated with the resistance source allowing only one of the first and second electrical signals to flow through the resistance source and means associated with the nulling resistor allowing only the other of the first and second electrical signals to flow through the nulling resistor;

means for detecting the voltage components of first and second electrical signals flowing through the conductors as a result of the interaction of the first and second electrical signals with the resistance source, the nulling resistor, and the resistance of the conductors; and means for determining from the first and second resultant electrical signals the value of the resistance source.

38. A telemeter according to claim 37 wherein the means for determining from the first and second resultant electrical signal the value of the resistance source includes means for solving Equation (10).

39. A telemeter according to claim 38 wherein the means for solving equation (10) is a properly programmed computer.

40. A telemeter according to claim 37 wherein the regulating means regulates the first and second electrical signal so that the current component of each of the signals is substantially constant and identical in absolute magnitude and is of opposite polarity from the other of the current components.

41. A telemeter according to claim 38 wherein the means for determining from the first and second resultant electrical signals the value of the resistance source comprises:

means for subtracting the absolute value of the voltage component of one of the first and second resultant electrical signals from the absolute value of the voltage component of the other of the first and second resultant electrical signals to obtain a remainder; and means for dividing the remainder by the absolute value of the current component of the first and second resultant electrical signals.

42. A telemeter according to claim 20 wherein the electrical quantity is a plurality of electrical quantities of the same type arranged in a selected network.

43. An apparatus to be coupled through conductors to a remote device for alternately generating first and second electrical signals and for detecting the resultant electrical signals flowing through the conductors as a result of the first and second signals interacting with the apparatus, the apparatus comprising:

a thermocouple having a measuring junction and a reference junction;

means for compensating for the voltage generated by the reference junction of the thermocouple connected in series with the thermocouple, the reference junction compensation means having a variable ohmage which is linear and proportional to its ambient temperature for a preselected range of ambient temperatures, the variable ohmage of the reference junction compensation means being sufficiently large throughout the preselected range of temperatures with respect to the resistance of the conductors so that the effects of the resistance of the conductors are negligible; and an isothermal enclosure in which at least the reference junction compensation resistor and the reference junction of the thermocouple are maintained.

44. A thermocouple module for connection through electrical conductors with a remotely located generating and detection device which generates alternately first and second electrical signals and applies such signals through the conductors to the thermocouple module and detects the first and second resultant electrical signals flowing through the conductors as a result of the interaction of the first and second electrical signals with the thermocouple module, the thermocouple comprising:

a thermocouple having a measuring junction and a reference junction;

a reference junction compensation resistor connected in series with the thermocouple, the reference junction compensation resistor having a variable ohmage which is linear and proportional to its ambient temperature and possessing temperature/ohmage characteristics such that when the one of the first and second electrical signals is applied therethrough there is produced a voltage drop thereacross with twice the magnitude of the voltage generated by the reference junction of the thermocouple;

means for nulling the reference junction compensation resistor connected in parallel with the reference junction compensation resistor;

means associated with the reference junction compensation resistor for allowing only one of the first and second electrical signals applied through the conductors to the thermocouple module to flow through the reference junction compensation resistor and means associated with the nulling means for allowing only the other of the first and second electrical signals to flow through the nulling means, the flow-allowing means being arranged such that both the first and second electrical signals flow through the thermocouple; and an isothermal enclosure in which at least the reference junction compensation resistor and the reference junction of the thermocouple are maintained.

45. A thermocouple module according to claim 44 wherein the nulling means comprises a variable resistor and wherein each of the flow-allowing means comprises at least one diode polarized in a preselected manner and connected in series with the reference junction compensation means and the nulling resistor, respectively.

46. A resistance module for connection through electrical conductors with a remotely located generating and detection device which generates alternately first and second electrical signals and applies such signals through the conductors to the resistance module and detects the first and second resultant electrical signals flowing through the conductors as a result of the interaction of the first and second electrical signals with the resistance module, the resistance module comprising:

a first resistor;

a nulling resistor connected in parallel with the first resistor and adjusted to have a known ohmage equal to the known ohmage of the first resistor at a preselected state; and means associated with the first resistor allowing only one of the first and second electrical signals applied through the conductors to the resistance module to flow through the first resistor and means associated with the nulling resistor allowing only the other of the first and second electrical signals to flow through the nulling resistor.

47. A generating and determining apparatus for connection through electrical conductors with a remotely located thermocouple module including a thermocouple having a measuring junction and a reference junction and including a reference junction compensation means, the generating and detecting means comprising:
 means for generating alternately first and second electrical signals and for applying the signals through the conductors;
 means for detecting first and second resultant electrical signals flowing through the conductors as a result of the interaction of the first and second electrical signals with the remotely located thermocouple module; and
 means for determining from the first and second resultant electrical signals the value of the measuring junction of the thermocouple contained in the thermocouple module.

48. A generating and determining apparatus for connection through electrical conductors with a remotely located resistance module including a first resistor, a nulling resistor connected in parallel with the first resistor, and means associated with the first resistor and the nulling resistor allowing current to flow in only one direction through each of them, the generating and determining apparatus comprising:
 means for generating alternately first and second electrical signals and for applying the signals through the conductors;
 means for detecting first and second resultant electrical signals flowing through the conductors as a result of the interaction of the first and second electrical signals with the remotely located resistance module; and
 means for determining from the first and second resultant electrical signals the value of the first resistor contained in the resistance module.

49. A telemeter according to claim 19, wherein:
 the means for alternately generating first and second electrical signals of opposite polarity includes means for alternately generating first and second square wave electrical signals of opposite polarity; and
 the means for regulating the first and second electrical signals includes a shunt regulator coupled to the output of the square wave means for regulating the absolute magnitude of the current of each of the first and second electrical signals.

50. A telemeter according to claim 49 wherein the shunt regulator includes:
 a Zener diode connected in a bridge circuit so that it operates bidirectionly and provides a reference voltage;
 a resistance in series with the two conductors for providing a transistor biasing voltage; and
 a bidirectional transistor circuit connected in series with the reference voltage means and connected across the two conductors for shunting current responsive to the reference voltage and the transistor biasing voltage to maintain a constant current through the two conductors.

51. A telemeter according to claim 37, wherein:
 the means for alternately generating first and second electrical signals includes means for alternately generating first and second square wave electrical signals of opposite polarity; and
 the means for regulating the first and second electrical signals includes a shunt regulator coupled to the output of the square wave means for regulating the absolute magnitude of the current of each of the first and second electrical signals.

52. A telemeter according to claim 51 wherein the shunt regulator includes:
 a Zener diode connected in a bridge circuit so that it operates bidirectionly and provides a reference voltage;
 a resistance in series with the two conductors for providing a transistor biasing voltage; and
 a bidirectional transistor circuit connected in series with the reference voltage means and connected across the two conductors for shunting current responsive to the reference voltage and the transistor biasing voltage to maintain a constant current through the two conductors.

53. A telemeter according to claim 37 wherein the means for determining from the voltage components of the first and second resultant electrical signals the value of the resistance source includes:
 first and second RC networks, the capacitances of the two RC networks being commonly connected;
 first diode means for applying the voltage component of the first resultant electrical signals across the first RC network;
 second diode means for applying the voltage component of the second resultant electrical signal across the second RC network;
 each RC network having a relatively long time constant whereby the capacitance of the first RC network will remain charged until the capacitance of the second RC network is charged;
 voltage divider means coupled to the output of the two commonly connected capacitances; and
 means for measuring the difference between the charges on the two capacitances coupled to the output of the voltage divider means.

54. A method of determining the value of a remotely located electrical quantity whereby the electrical quantity and the determining apparatus need be connected only with two ordinary electrical conductors and the resistance of the two conductors does not produce error in the determination, and whereby no power source need be located at the electrical quantity, including the steps of:
 applying alternately and individually first and second equal electrical signals of opposite polarity through the two conductors whereby at least one of the first and second electrical signals is applied to the electrical quantity to be measured;
 maintaining constant one of the electrical parameters of current and voltage of each of the first and second electrical signals during said application of the first and second electrical signals;
 detecting the other one of the electrical parameters of current and voltage resulting in the two conductors from said application of the first and second electrical signals; and
 determining from said detected parameter the value of the electrical quantity to be measured.

55. A method of determining the value of a remotely located electrical quantity according to claim 52, wherein the step of determining from the detected parameter the value of the electrical quantity to be measured includes the step of:
  determining the difference between the values of the detected parameter of voltage and current resulting from said application of the first and second electrical signals.

56. A method of determining the value of a remotely located electrical quantity according to claim 52, wherein the step of determining from the detected parameter the value of the electrical quantity to be measured includes the step of:
  integrating the algebraic sum of the detected parameter of voltage and current resulting from said application of the first and second electrical signals.

57. A method of determining the value of a remotely located electrical quantity according to claim 52 wherein the step of alternately and individually applying the first and second equal electrical signals through a pair of conductors connecting with the electrical quantity to be measured includes the step of:
  applying one of the first and second electrical signals to the electrical quantity to be measured and the other of the first and second electrical signals through a secondary reference device in parallel with the electrical quantity to be measured.

58. A method of determining the value of a remotely located electrical quantity according to claim 57 wherein the step of applying one of the first and second electrical signals through the electrical quantity to be measured and the other of the first and second electrical signals through a secondary reference device includes the step of:
  routing the first and second electrical signals by unidirectional current means in series with the electrical quantity being measured and with the secondary reference device, respectively.

59. The method of determining the value of a remotely located electrical quantity according to claim 52 wherein the step of individually applying first and second equal electrical signals through the pair of conductors connecting with the electrical quantity to be measured includes the step of:
  applying both the first and second electrical signals through the electrical quantity to be measured.

60. A method of determining the value of a remotely located electrical quantity according to claim 52 wherein the step of maintaining one of the electrical parameters of current and voltage constant during the application of the first and second electrical signals to the pair of conductors includes the step of:
  maintaining the current of each of the first and second electrical signals constant while permitting the voltage of such signals to vary; and
  the detecting step includes detecting the varying voltage resulting from the first and second electrical signals being applied to the two conductors and at least one of the first and second electrical signals being applied to the electrical quantity to be measured.

* * * * *

UNITED STATES PATENT OFFICE
CERTIFICATE OF CORRECTION

Patent No. 3,825,733          Dated July 23, 1974

Inventor(s) Dowell White et al.

It is certified that error appears in the above-identified patent and that said Letters Patent are hereby corrected as shown below:

Claim 33 should depend from claim 19, rather than from claim 20. Each of claims 55, 56, 57, 59 and 60 should depend from claim 54, rather than from claim 52.

Signed and sealed this 3rd day of December 1974.

(SEAL)
Attest:

McCOY M. GIBSON JR.
Attesting Officer

C. MARSHALL DANN
Commissioner of Patents